UNITED STATES PATENT OFFICE.

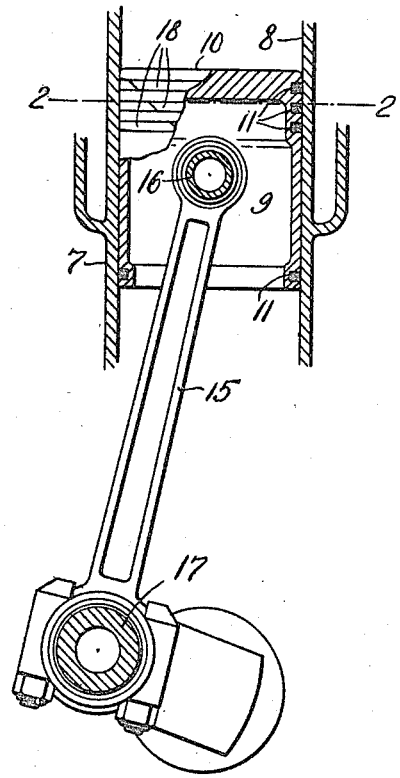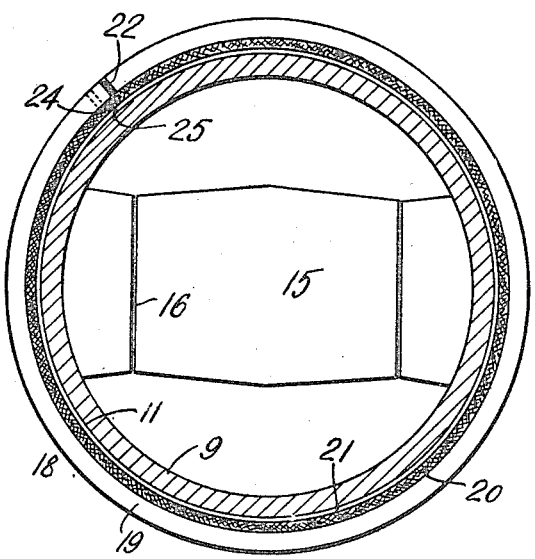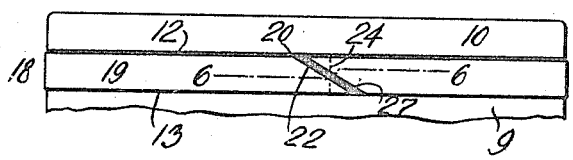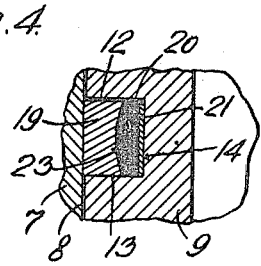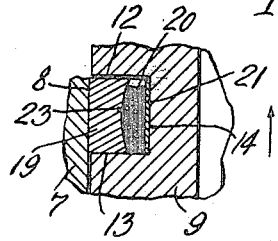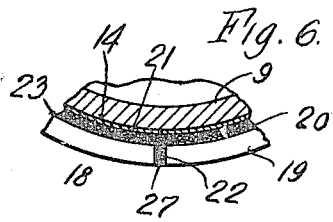

ARTHUR J. SAUER AND JOHN J. GEORGI, OF BUFFALO, NEW YORK, ASSIGNORS TO SAUER-GEORGI MANUFACTURING COMPANY, INC., OF BUFFALO, NEW YORK.

PISTON-RING.

1,239,726.      Specification of Letters Patent.      Patented Sept. 11, 1917.

Application filed September 16, 1916. Serial No. 120,477.

*To all whom it may concern:*

Be it known that we, ARTHUR J. SAUER and JOHN J. GEORGI, citizens of the United States, residing at Buffalo, in the county of Erie and State of New York, have invented a new and useful Improvement in Piston-Rings, of which the following is a specification.

This invention relates to a composite piston ring used in connection with reciprocating pistons of engines, pumps and the like.

In the present specification the piston ring is described as used in connection with the piston of an explosive engine, but it is to be understood that the invention is not confined to such use of the ring as it may also be used advantageously in connection with steam engines, pumps and like devices which have a piston operating in a cylinder.

One object of the invention is to produce a piston ring of simple and cheap construction, which will increase the efficiency of the engine, diminish the amount of oil ordinarily used in the lubrication of the engine pistons and cylinders, and diminish wear on the cylinder walls.

Another object of the invention is to so construct the ring that the deposits of carbon produced in the compression chamber of the engine will be minimized. Such deposits are ordinarily caused by an excess of lubricating oil passing between the cylinder wall and the piston and entering the compression chamber of the engine. By the use of this ring, such excess oil is practically done away with and the oil is deposited on the working surface uniformly and at just sufficient speed and in sufficient quantity for proper lubrication of the surface.

Another object of the invention is to produce a ring of such construction, that if by any chance the oil in the crank case should be used up, the ring itself will retain sufficient oil so that the engine can be run a considerable time without injury thereto.

Another object is to produce a ring which will not wear out the edges of the ring seat or the packing as is the case with the piston rings used heretofore.

In the accompanying drawings:—

Figure 1 is a fragmentary sectional elevation showing a portion of an engine cylinder and piston, the piston being provided with rings which embody the invention.

Fig. 2 is a horizontal section on an enlarged scale on line 2—2, Fig. 1.

Fig. 3 is a fragmentary elevation of the upper portion of the piston and one of the piston rings embodying the invention.

Fig. 4 is a fragmentary vertical section on a still larger scale of the piston and piston ring.

Fig. 5 is a similar view illustrating the effect produced on the packing strip in operation.

Fig. 6 is a fragmentary horizontal section on line 6—6, Fig. 3.

7 represents the cylinder of an ordinary explosive engine and 8 the inner working surface of the cylinder. 9 is the reciprocating piston which is provided with the usual piston head 10 and has the ring seats 11, each of said seats comprising an upper horizontal surface 12, a corresponding parallel lower surface 13 and the vertical surface 14 connecting the upper and lower surfaces. Four of such ring seats are ordinarily provided, three at the upper portion of the piston and one at the lower portion thereof, although such number is by no means arbitrary and may be varied to suit different conditions. 15 is the piston rod which is secured to the piston 9 by means of the wrist pin 16 and 17 is the crank shaft. All of these parts are well known and may be of any usual construction.

18 represents the composite piston ring which forms the subject of this invention. This ring consists primarily of three parts, an outer metallic ring 19, a strip of resilient and absorptive material 20 and an inner expansion ring 21. The outer ring 19 is provided with the usual inclined or oblique cut or split 22 and is made of resilient material so as to enable it to adjust itself to the cylinder wall. The inner face thereof is provided with a groove, preferably curved as shown at 23 in Figs. 4 and 5 and the strip 20 is adapted to be inserted in the groove 23 before the ring is applied to the piston.

Any suitable resilient and absorptive material, preferably a fabric such as felt can be used for the strip 20, the ends thereof being cut at an angle to the split 22 and preferably straight as indicated at 24. The member 19, due to its resiliency, when not under compression has the split edges 22 thereof distended and the fabric is of such a length that its ends will at such time be in contact.

The expansion ring 21 also preferably has its ends cut straight as at 25 and is of such length that its ends will contact when the ring 19 is placed in the cylinder.

In assemblying the ring the strip 20 is placed in the groove 23 of the outer ring 19 and is held in place by the ring 21 in such position that the ends of the strip 20 are in contact at the split 22 of the outer ring while the ends of the ring 21 are approximately in alinement with such split 22. The purpose of such arrangement is hereinafter set out.

It is well known that in engines of this kind there is produced what is known as the "overlap" of the inlet and exhaust valves, which occurs immediately after the piston has reached its upper dead center position. The exhaust valve closes at this time a short period before the inlet valve opens and meanwhile the piston is descending and a vacuum is produced, which in the case of the piston rings heretofore used causes an excessive amount of oil to be drawn into the compression chamber of the cylinder around the rings. An excess of oil is also ordinarily introduced into the compression chamber on the intake stroke of the piston.

The present construction of the piston ring, however, does away with this difficulty. With such construction, when the piston moves upwardly in the cylinder, as indicated by the arrow in Fig. 5, the piston ring is held to the lower surface 13 of the ring seat by compression and the compression also forces the strip 20 downwardly between the groove 23 and the outer surface of the expansion ring 21, thereby reducing the loss of compression to a minimum and increasing the efficiency of the engine. On the downstroke of the piston the process is reversed, the ring here being held to the upper surface 12 of the ring seat and the suction drawing the strip 20 upwardly and wedging it securely in the manner heretofore set out. The strip 20 when so wedged between the groove and the inner surface of the expansion ring forms an effective barrier which prevents any excess of oil passing the piston ring and entering the compression chamber. By such action of the strip in the groove, oil is also prevented from passing along the surface 13 and up between the surface 14 and the inner surface of the outer ring 19. By having the strip 20 of a slightly greater width than is the outer ring 19, when such ring is compressed the edges of the felt protrude to a small degree beyond the edges of the ring and oil is prevented from passing along the surfaces 12 and 13 of the ring seat.

In engines of this character the oil is fed to the piston and cylinder walls by what is known as the "splash" system and is thrown on the cylinder walls by the revolution of the crank shaft in the oil well or crank case.

As the strip 20 consists of felt or a similar resilient and absorptive material which will readily absorb and retain oil, on each stroke of the piston, just sufficient oil is forced out of said strip and against the wall of the cylinder so as to insure a proper and uniform lubrication of the working surfaces while at the same time sufficient oil will be retained by the strip so that if the ordinary feed supply runs dry, enough oil will remain therein so that the engine can be run some time without injury thereto. By preventing an excess of oil from entering the compression chamber carbon deposits in said chamber are practically done away with.

As aforementioned, the ends of the strip 20 contact at the split 22 of the outer ring 19 when such ring is not under compression. When the composite ring 18 is placed in position in the ring seat of the piston and the latter is inserted in the cylinder the resilient ring 19 is compressed and the ends of the strip 20 are forced outwardly between the edges of the cut or split 22 of the ring 19, as indicated at 27 in Figs. 3 and 6, thus serving to entirely close up the opening between the edges of said split and preventing any leakage of oil down the sides of the ring and through the ends thereof.

It is also well known that in engines of this type when operated by a "self starting" device, that when such starter is used, the engine having been standing "cold" the air inlet of the carbureter is "choked down" and a copious flow of gasolene, in a liquid state, is introduced into the cylinder before the first explosion takes place. Much of this gasolene, where the ordinary piston rings are used, leaks past the rings and enters the crank case of the engine, there mixing with the lubricating oil in the case, resulting in harm being done to the bearings and scoring of the cylinder walls. Such action also destroys the efficiency of the lubricating oil.

With the present construction of piston ring, however, such leakage of gasolene is practically eliminated in the same manner as before explained in connection with the retarding action which the ring has on the oil.

In constructing the ordinary cylinder and piston, a clearance of approximately three to five one thousandths of an inch exists between the piston and cylinder wall, as on such manufacture one thousandth of an inch clearance is allowed for every inch of diameter of the piston. Due to such clearance the piston has a slight circular motion with the wrist pin as a center of revolution and in relation to the cylinder, when moving up and down in the latter. When there are several piston rings at the upper portion of the cylinder this rocking movement is most prominent in the uppermost ring as such ring is farther away from the wrist pin and the edges of the ring seat of the uppermost ring are therefore worn away much more rapidly than is the case with the lower rings. This necessitates repairing the upper ring seat or replacing the entire piston much more often than is the case when the present form of piston ring is used.

By using the form of ring embodied in this invention the outer periphery of the ring will at all times be concentric with the cylinder wall as the ring will rock on the strip 20, owing to its curved inner face. This will allow a relative movement between the ring and the piston permitting the piston to rock on its wrist pin, as aforementioned, without such movement affecting the ring.

By having the groove 23 concaved or made on a radius which is approximately the same as the distance of the groove from the axis of the piston and the strip 20 resting in said groove, the function of such parts is similar to that of a ball and socket joint and not only is the wear on the edges of the ring seat reduced to a minimum, but wear of the strip 20 at the point where such strip is in contact with said edges is also overcome. This fact is of considerable importance and does away with any frequent replacements of the strip.

The ring 18 is exceedingly economical as it is of such construction, form and size that it can be used to replace ordinary piston rings without requiring any change to be made in the ring seat or piston.

We claim as our invention:—

1. A composite piston ring consisting of an outer ring provided with a groove on the inner surface thereof, a strip of resilient and absorptive material adapted to enter said groove, and elastic means adapted to hold said strip in said groove.

2. In a composite piston ring, the combination with an outer resilient ring having a groove formed on the inner surface thereof, of a fabric strip adapted to enter said groove and an expansion ring of slightly smaller diameter than the outer ring and the strip and adapted to hold the fabric in place in the groove.

3. In a composite piston ring, the combination of an outer resilient ring provided with a groove on the inner surface thereof and having an inclined slit therein, a fabric strip adapted to enter said groove and having the extremities thereof cut at an angle to said inclined slit, and an expansion ring of smaller diameter than the outer ring and adapted to hold the fabric in place in the groove.

4. In a composite piston ring, a resilient outer ring having a slit therein, an oil-retaining strip of fabric having its ends terminating in proximity to said slit and an expansion ring which presses said fabric strip against the inner face of said outer ring, the ends of said fabric strip entering into said slit for closing the same when said outer ring is compressed.

5. In a composite piston ring, a resilient outer ring having an inclined slit therein, an oil-retaining strip of fabric having its ends cut square and an expansion ring which presses said fabric strip against the inner face of said outer ring, the ends of the fabric strip entering into said slit for closing the same when said outer ring is compressed.

6. In a composite piston ring, a resilient outer ring having a slit therein and provided with a groove formed on the inner surface thereof, a strip of resilient and absorptive material having its ends cut square and an expansion ring which is adapted to hold said strip of resilient material in place in the groove, the ends of said resilient strip entering into said slit for closing the same when the outer ring is compressed.

7. In a composite piston ring, the combination of an outer ring provided with a groove on the inner surface thereof, and having an inclined slit formed therein, a fabric strip adapted to enter said groove and having the extremities thereof cut at an angle to said inclined slit, and an expansion ring of smaller diameter than the outer ring having its edges also cut straight and adapted to hold the fabric in place in the groove.

8. A composite piston ring consisting of an outer ring provided with a concave groove on its inner surface, a strip of fabric adapted to rest in said groove, said fabric being slightly wider than is the outer ring, and an expansion ring adapted to hold the fabric in place in the groove.

Witness our hands this 15 day of September, 1916.

ARTHUR J. SAUER.
JOHN J. GEORGI.

Witnesses:
M. J. PITMAN,
C. W. PARKER.